United States Patent [19]
Ovadia

[11] Patent Number: 5,272,299
[45] Date of Patent: Dec. 21, 1993

[54] COMBINATION MICROWAVE AND CONVECTION OVEN AND METHOD OF USING

[75] Inventor: David Ovadia, Manhattan, Kans.

[73] Assignee: Kansas State University Research Foundation, Manhattan, Kans.

[21] Appl. No.: 849,428

[22] PCT Filed: Sep. 9, 1991

[86] PCT No.: PCT/US91/06480
§ 371 Date: Jun. 22, 1992
§ 102(e) Date: Jun. 22, 1992

[51] Int. Cl.⁵ .............................................. H05B 6/80
[52] U.S. Cl. ...................... 219/10.55 R; 219/10.55 E; 219/400; 126/21 A
[58] Field of Search ................... 219/10.55 B, 10.55 R, 219/10.55 E, 10.55 F, 10.55 M, 400; 126/21 A, 21 R

[56] References Cited

U.S. PATENT DOCUMENTS

| | | | |
|---|---|---|---|
| 3,884,213 | 5/1975 | Smith | 219/10.55 R |
| 4,283,614 | 8/1981 | Tanaka et al. | 219/10.55 R |
| 4,803,324 | 2/1989 | Fujii et al. | 219/10.55 E |
| 4,940,869 | 7/1990 | Scholtes et al. | 219/10.55 F |
| 5,111,012 | 5/1992 | Hyun et al. | 219/10.55 R |
| 5,166,487 | 11/1992 | Hurley et al. | 219/10.55 R |

*Primary Examiner*—Philip H. Leung

*Attorney, Agent, or Firm*—Hovey, Williams, Timmons & Collins

[57] ABSTRACT

A combined microwave and conventionally heated oven includes first and second chambers separated from one another by a partition including first and second spaced panels which define a cavity therebetween. These panels are both metallic, except where the microwave waveguide passes through rectangular gaps in them, in which are situated rectangular, non-metallic, infrared-absorbing panels of the same size. A microwave generator is provided in the second chamber for generating microwaves for use in heating a product positioned in the first chamber. Convention heater(s) (gas and/or electrical resistance) is/are also provided. A stream of cooling air reduces the temperature within the cavity in order to insulate the second chamber from the transfer of heat emitted from the first chamber in operation of the conventional heater(s). Infrared radiation absorbing panels mentioned at the end of the microwave waveguide, and forming non-metallic sections of the above cavity's walls, permit the passage of microwaves from the microwave generator through the partition to the first chamber. This is in order to carry out microwave heating of the product while absorbing infrared radiation emitted from the hot first chamber that would otherwise travel back through the microwave waveguide and thermally damage the heat-sensitive microwave generator. A method for heating a product in this combination oven is also disclosed.

11 Claims, 4 Drawing Sheets

COMBINATION MICROWAVE AND CONVECTION OVEN AND METHOD OF USING

BACKGROUND OF THE INVENTION

1. Field of the Invention

This invention relates generally to ovens and, in particular, to a combined microwave and convection oven for use in the domestic or institutional food service industries and to a method of using such an oven.

2. Discussion of the Prior Art

Microwave ovens produce quick, penetrating heat in the center of food objects, beneath their outer surface. This differs from conventional heat that usually takes much longer to penetrate into the product from outside through its outer surface. Accordingly, domestic microwave ovens are commonly used for the very rapid reheating and/or cooking and/or thawing of foods.

Common applications of domestic microwave ovens are:

A. Reheating of ready-made meals that are:
 1. Frozen and kept in the freezer at about −18° C.
 2. Chilled and kept in the refrigerator at about +4° C.
 3. "Shelf-stable", i.e., are sterile and can be kept on the kitchen shelf (usually about +20° C.) without refrigeration.
B. Thawing cum cooking/baking and/or reheating of bakery products such as croissant and pizza.
C. Cooking or popping of popcorn. Microwave popcorn has one major setback, which is that a larger than usual proportion of the corns (called "non-poppers") do not pop. Millions of dollars have gone into research of this problem and no solution has been found.
D. Thawing of frozen meat to be cooked.

A major disadvantage of microwave heating is that it does not brown and dehydrate the exterior of the food as with conventionally heated ovens. With microwaves alone meat cannot be roasted and bread cannot be baked, for instance. Products such as pizza and croissant do not achieve the required crispness and baked appearance, aroma and texture that are their essential organoleptic characteristics. This is true even if they have been fully baked before freezing (should they be frozen).

The combination oven was developed in an effort to overcome the aforesaid major disadvantage.

Such combination ovens combine microwave with conventional heating, usually by using conventional electrical resistance heaters, although also by using gas combustion. Even in such combination ovens, however, a ready-made crisp crust or flaky pastry usually becomes soft, soggy, wet and wrinkled. This is due to the much faster heating by microwaves relative to conventional heating. The come-up time required for the heating elements to become hot and transfer heat to air in the oven (usually to 160° to 250° C.) takes about 10 to 15 minutes. This is much longer than the time required to heat the food with microwaves, which is typically 0.5 to 4.0 minutes.

It is well known that, in microwave heating, the product being heated acts as a heating element converting the electromagnetic waves transmitted directly into heat within its center. Such rapid internal heat generation serves to drive steam from the product center to the colder product surface where condensation occurs rendering the product surface wet.

Combination ovens can usually operate in three basic modes: microwave heating only, convection heating only or the combination of the two modes at the same time.

For operation in the combined mode the total consumption has to be limited by the manufacturer to the maximum power available at the site, commonly between 2000 and 3000 watts.

Another advantage of gas combustion heating over electrical heating is that a much larger quantity of heat can be very rapidly generated, without overloading the domestic mains electricity supply. In addition to that, the microwave energy output could remain simultaneously at its maximum. The simultaneous power consumption by conventional resistance heating elements and the microwave generator has to be balanced so as not to exceed the power limit of a domestic socket. This increases the potential applicability of such known combination ovens that use gas.

Despite the above-mentioned advantages, combination gas-heated ovens do not enjoy great commercial success, compared to those with electrical heating, as they are much more complex and expensive since they require two, independent heating systems of gas and electricity. A gas combustion system of itself is much more complex and cumbersome than an electrical heating system. The microwave generating and transmitting system is inherently extremely complex and expensive, and consequently additional heating systems combined into the oven should, preferably, be as simple and as cheap as possible.

Another problem with gas systems is that a ventilation system is required to expel exhaust gases from the area in which the oven is used. In an institutional environment such ventilation systems should be commonplace but in domestic applications this would usually be absent in a domestic kitchen and would add greatly to the overall cost of purchase and installation of the oven system.

An exposed gas combustion system cannot burn simultaneously with microwaves being generated in the same chamber as damage to the gas burner will occur. One known solution to this problem is to install the gas burners within a separate chamber. A shielding partition is placed between the cooking chamber and the burner chamber. The partition is perforated to allow the hot combustion gases through small holes to the cooking chamber, aided by a fan. The holes are sized such that microwaves cannot pass through the partition from the cooking chamber to the burners. This method provides for slower cooking as the flow of heating gases to the cooking chamber is inhibited by the perforated wall. In this case the conventional heat cooking speed would be hindered by the partition from matching that of the microwaves.

OBJECTS AND SUMMARY OF THE INVENTION

It is an object of the present invention to provide a combination oven which obviates or mitigates the disadvantages and drawbacks of known combination ovens to provide faster and better cooked food with improved aroma, texture and/or appearance.

It is another object of the present invention to provide a method of operating a combination oven to cook food without the drawbacks of conventional methods in order to provide cooked foods having less surface moisture and improved organoleptic characteristics.

Before detailing the present invention reference is made to conventional hot air(gas) oven heating with particular reference to the surface heating of the product being heated.

For convenience reference is made hereinafter only to hot air although it is to be clearly understood that reference to "air" include any other applicable gas.

The precise mechanism of heat transfer from hot oven air to the surface of food being heated in it is highly complex. Nevertheless it is well known that surrounding the surface of the food being heated is a layer of thermally insulating gases. Its temperature is between that of the heating gas and the temperature of the food body and it severely limits heat transfer.

For a given oven at a given temperature, the colder the surface of the food the denser, more thermally protective, and less penetrable the insulating layer of gases is. In this way, a product surface at −18° C. is therefore more resistant to being heated than a food surface at +4° C., which is in turn, more so than a food surface at room temperature of about +20° C.

For a given food surface temperature, the higher the oven temperature the greater the thermal penetration is through this insulating layer of gases. For example, for the surface of a frozen pie at −18° C., the heating through this layer of insulating gases is greater if the oven chamber is at 350° C. than if it were at 250°.

The heating of many food surfaces is additionally retarded by an undesired moisture content. This must be dried off to produce, for instance, a dry crisp crust and aroma at about 150° C. to 200° C. A moist surface will remain at 100° C. or thereabouts until all the moisture is driven off. Such drying requires that the latent heat of vaporization of water be supplied and this retards the rise in temperature of the surface above 100° C.

The above problem of moisture on the surface of food is worsened if the food is cooler than room temperature at, say +4° C. and even more so at −18° C., because additional moisture from the air condenses and, at −18° C., freezes or sublimes onto the surface.

As has been mentioned above, this problem of unwanted moisture on the food surface is made worse by condensation of additional water vapor migrating from within food which is microwave heated. The escape of hot water vapor to the surrounding air will be further hindered by the dense, wet surface being a greater barrier to mass transfer than the dry surface.

For the surface of frozen food, heating to the desired temperature is retarded yet more, not only by the low temperature of the food and the above considerations but at 0° C. the heat of fusion of ice has also to be supplied.

The heat barriers which must be overcome in the convection hot air heating of food can thus be summarized as consisting of the layer of thermally insulating gases surrounding the food and the moisture content of the food with additionally, in the case of frozen foods, ice.

According to the present invention there is provided a combination oven in which food is heat treated (thawed, cooked and/or baked), preferably starting from a cold (ambient temperature) oven, i.e. no preheating of the oven, by the rapid elevation of the air temperature to a value substantially in excess of that to which the same food would normally be subjected, and the maintenance of this excess temperature value for a short duration followed by lowering of the temperature to a desired constant treatment temperature.

Such hot air convection heating action overcomes the aforementioned heat barriers and ensures rapid heating of the food surface and regions of the food immediately below the surface and serves to match the simultaneous fast microwave heating of the center of the food.

Such rapid excess temperature hot air convection heating of food will be an unexpected step to those skilled in the art of food technology since the food would normally be expected to burn. This is avoided by the joint actions of the aforesaid heat barriers and the short period of time during which the excess temperature is maintained.

The decrease in oven air temperature to the constant treatment temperature may occur by natural cooling and/or by an applied cooling action, for example supply of cooling fluid (usually air).

More specifically, and by way of example, the combination oven cooking cycle according to the invention starts with the oven air in the cold state, usually about +20° C., and then the oven air is heated from about 20° C. to 260° to 400° C. within 10 to 25 seconds, is held at that temperature for about 3 seconds and then cools within about 10 seconds to the desired constant cooking temperature (usually 160° to 250° C.). By so doing the heat barriers are sufficiently overcome to bring the surface and immediately beneath the surface of the food to the desired temperature (usually 100° to 200° C.), within about 20 to 40 seconds. This is in order to match the simultaneously fast heating of the center of the food by microwaves.

As aforesaid, this action is non-obvious because it is well known that food usually burns at temperatures of 260° to 400° C. The food will not burn, however, because of the presence of the heat barriers to convention heat transfer and the brief exposure to the high temperatures.

The temperature of the oven can rapidly reach 400° C. and steps have to be taken to thermally protect heat-sensitive electronic components. In particular a magnetron, which generates microwaves within the oven, needs particular attention. The magnetron can be damaged by infra-red heat radiation that is emitted from hot oven gases and walls. Infra-red rays must be prevented from travelling through the microwave waveguide to the magnetron, via a waveguide window in the oven chamber.

It is known from U.S. Pat. No. 4,211,909 to use a one-way window which allows microwaves through it in one direction from the magnetron to the oven and prevents infra-red radiation from travelling in the opposite direction from the oven through the microwave waveguide to the magnetron. The window is made of silicone and is coated with magnesium oxide or barium sulphide which gives it the desired properties.

This device has two disadvantages. The window itself can heat up to 400° C. and itself emit infra-red rays into the waveguide to the magnetron, and furthermore it is doubtful whether silicone can withstand temperatures of 400° C.

Preferably a combination oven constructed in accordance with the invention has an insulating chamber disposed between a cooking chamber and a chamber containing a magnetron for emitting microwaves and heat-sensitive components wherein the insulating chamber comprises a double wall cooled by air flowing through it.

Preferably said double wall has a double window therein disposed between the cooking chamber and microwave waveguide, wherein said window allows microwaves to pass through it from the magnetron to the cooking chamber and absorbs infra-red rays emanating from cooking chamber.

The infra-red rays are converted to heat which is removed by the cooling air passing through the double wall chamber.

The flow of cooling air can be directed in a favored direction to allow for aerodynamic flow. This may be effected by aerodynamically placed fins. In addition a fan or fans can be employed to accelerate the air flow.

Preferably the outlet flow of cooling air is channeled to supply any gas burners used in the oven.

The rapid elevation of the air temperature may be achieved by a gas burner providing an initial burst of high temperature heating before microwave heating is applied. Alternatively the rapid elevation of air temperature is effected by an electrical resistance heater.

As a further alternative a combination of gas and electrical resistance heaters can be used. In each case auxiliary or extra heaters or burners may be employed to achieve the initial burst of heat.

This invention is especially but not exclusively important in the case of bakery products such as frozen pizza, frozen croissant and chilled pies. As an example, reference is made to typical, frozen, ready-made pizza, in which the cheese and other components of the top side such as tomato sauce and other additives have not yet been baked. It can be taken directly from the freezer at −18° C. and within about 50 seconds be thawed, heated internally to 70° to 100° C. and externally to 150° to 200° C. in the combination oven of this invention. This would produce a browned, crisp crust on the underside and a hot, browned, melted-cheese top side with all the additional, desired, characteristic, organoleptic qualities such as aroma.

Other products which can be more speedily cooked by the combination oven according to this invention are bakery products that have been partially baked and frozen such as a pale, half baked loaf of bread. These are usually intended for the thawing cum finish-baking and browning in conventional ovens.

BRIEF DESCRIPTION OF THE DRAWING FIGURES

A preferred embodiment of the present invention is described in detail below, by way of example, with reference to the accompanying drawing figures wherein.

DETAILED DESCRIPTION OF THE PREFERRED EMBODIMENT

Figure 1:
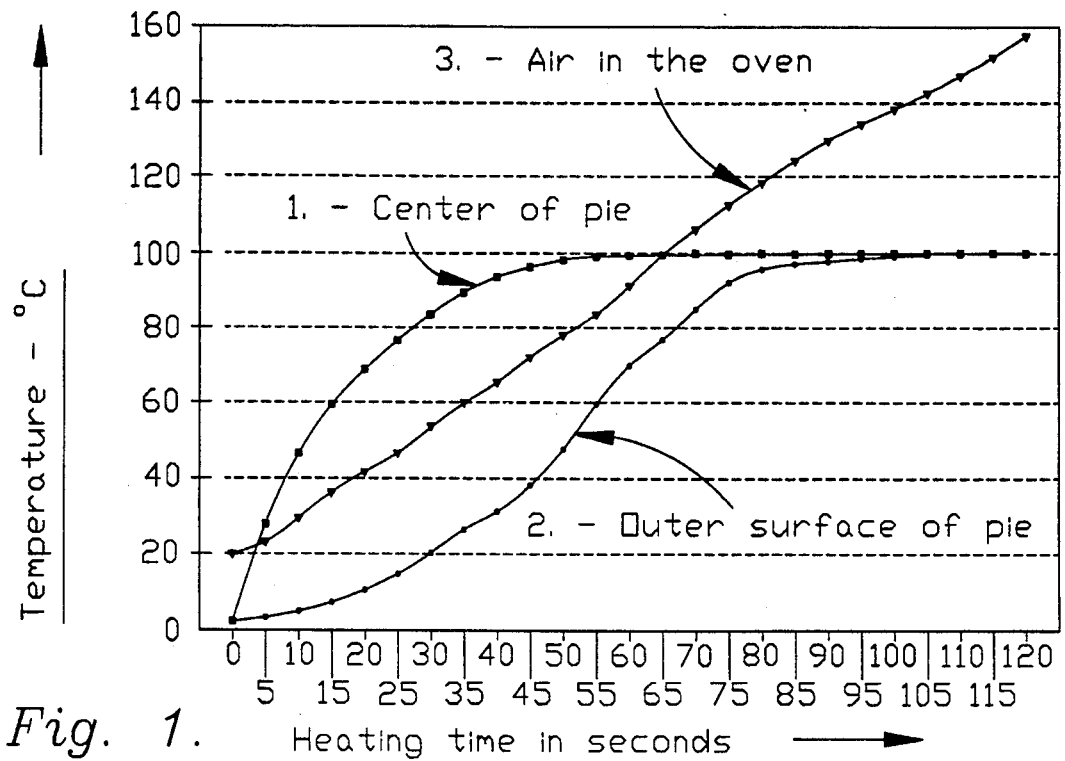
FIG. 1 is a heating curve graph for a steak and kidney pie cooked in a conventional manner in a known combination oven.

Prior to discussing the preferred embodiment of the present invention, reference is first made to FIG. 1, which summarizes the heating curves of a ready-baked and chilled steak and kidney pie, weighing about 200 grams, being reheated in a conventional manner in a known combination oven.

The center of the pie (Curve 1) heats up to about 100° C. in 50 seconds while the oven air (Curve 3) is still only 80° C. The surface of the pie (Curve 2) gains very little heat from the oven air, which is only fractionally warmer and is thermally isolated from it by convection heat transfer barriers. as discussed. Heating of the surface comes mainly from the hot water vapors from the moist center of the pie. In heating the outer crust of the pie the vapors themselves cool and condense on the crust, making it soft, soggy, wet and wrinkled, and the crust takes a long time to dry out again in the oven. Even if it does dry out, much of the desirable flavor, aroma and appearance will not return and the essential speed advantage is lost.

Reheating a frozen croissant by microwaves can take about 20 to 30 seconds, for instance, and drying wet crust would take about 10 minutes.

The rate of microwave heating is inversely proportional to the size and weight of the food. That is to say, for instance, that several small (50 gr.) and/or thin and-/or low-density items such as frozen pizzas or croissants will heat up much faster than a large (500 gr.) frozen steak and kidney pie. The significance of this is that for small and/or light and/or thin items the relative time gap between microwave heating and conventional heating is even greater than for heavier and/or denser items.

In known combination ovens that have electrical heating elements, which is usually the case, oven air is usually limited to an upper temperature of 250° C. In a small percentage of combination ovens, in which conventional heat is supplied by gas combustion, the upper temperature is usually 300° C. With most combination ovens the air temperature reaches 250° C. after about 15 minutes, because electrical heating elements take time to become sufficiently heated. Also, transfer of heat from these elements to air in the oven requires time, due to convection heat transfer barriers as discussed. In this respect, gas heating of such combination ovens is superior, because hot combustion gases are rapidly created by gas flames and can rapidly enter directly into the oven. This is so in such existing ovens, even though the hot combustion gases have to be blown through the barrier of a perforated partition by a circulating fan, as discussed.

It is manifest that electrical air heating could be accelerated by employing heating elements that consume more power, but in practice this could overload the domestic electricity power supply. Up to about 1400 watts of electricity input are commonly required for generating microwaves in domestic ovens, where the efficiency is about 50%, so the output is about half of that. Electrical resistance heaters commonly require about 1500 watts, making a total consumption of 2900 watts and approaching the upper limit for most domestic power outlets of 3000 watts.

Figure 2:
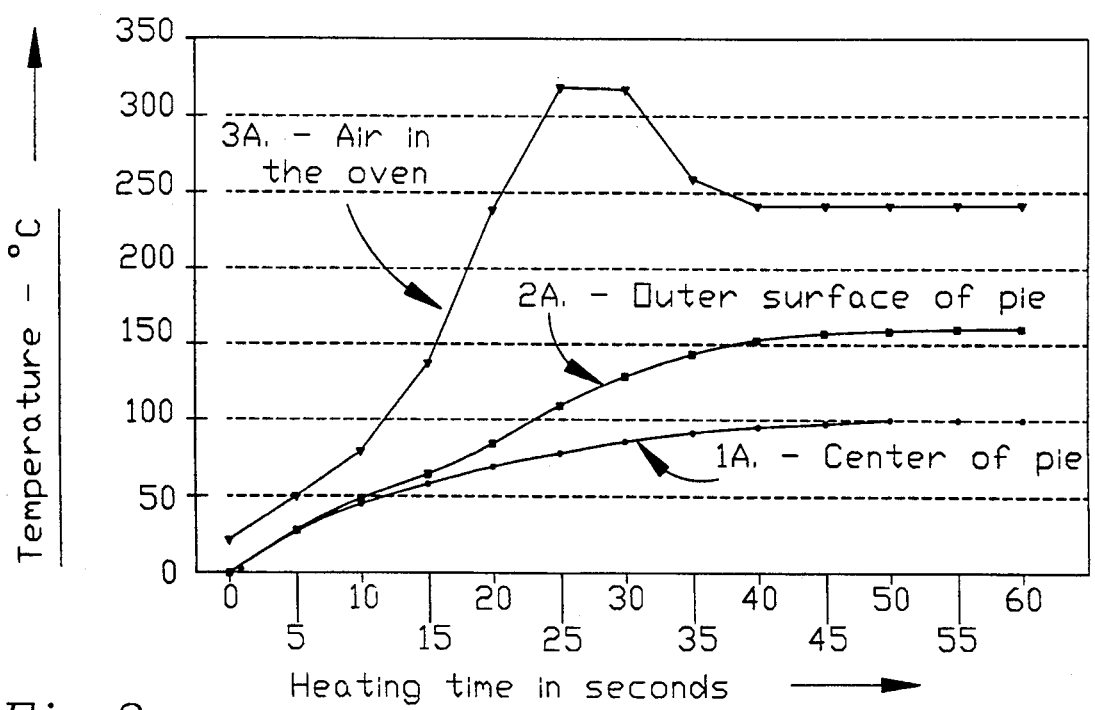
FIG. 2 is a heating curve graph for a steak and kidney pie cooked in accordance with an aspect the present invention.

Turning to FIG. 2, the heating curves are shown for the 200 gram chilled steak and kidney pie referred to with reference to FIG. 1, with the curves illustrating reheating of a pre-cooked and chilled steak and kidney pie in accordance with the method of the present invention in a combination oven constructed in accordance with the present invention.

It is to be noted that in this figure the microwave heating of the center of the pie is identical to that of FIG. 1 although this may appear to be different due to the changes in the time and temperature scales between FIGS. 1 and 2.

In FIG. 2, the center of the pie (Curve 1A) heats up to about 100° C. in 50 seconds (as in FIG. 1). The oven air (Curve 3A) rises to 320° C. within 25 seconds, holds that temperature for 3 seconds, and falls to a steadily held 240° C. after another 10 seconds. The surface of the pie (Curve 2A) very rapidly gains heat from the hot oven air, and moisture evaporates from the surface, which subsequently can and does attain a temperature of 160° C. Hot water vapor from the microwave heated center of the pie does not condense on the crust's hot surface, but gains more heat and passes through with considerably less barrier to mass transfer than if the crust was wet and dense. In addition, therefore, to a rapidly heated pie filling, the pie crust is browned, crisp and possesses all the other desirable, characteristic, organoleptic qualities such as aroma. This is achieved in about 40 seconds in the oven of this invention that was cold at the start.

This extremely rapid heating of air is preferably achieved by gas combustion, for the reasons mentioned above, but may alternatively be achieved by sufficiently high-powered electrical heating elements. Another reason for this preference is that heat generation can be more rapidly accelerated and decelerated with gas, by the immediate heating effect of igniting or extinguishing of gas flames or by making a major increase or reduction in their size. The heating and cooling of even high-power electrical heating elements is usually much more gradual.

Entrance of the very hot air and/or other gases from the burners into the oven cavity will be through several openings and in such a way to ensure very uniform heating of the food. Entrance through one opening and in an uneven fashion may cause uneven cooking and probably burnt spots.

It is considered that if the oven is brought to 260° to 400° C. very rapidly (within 10 to 30 seconds), and then the heating is either stopped or very considerably reduced, the oven temperature will rapidly drop to a lower temperature more desirable for completion of the reheating and/or cooking. This is due to the relative coolness of the oven, its surroundings and the food. Heat will escape to the surroundings and be absorbed by the oven and its contents. In the event that this rapid cooling is not sufficiently rapid itself, it may, for example be supplemented by the controlled introduction of cold air into the oven chamber.

Figure 6:
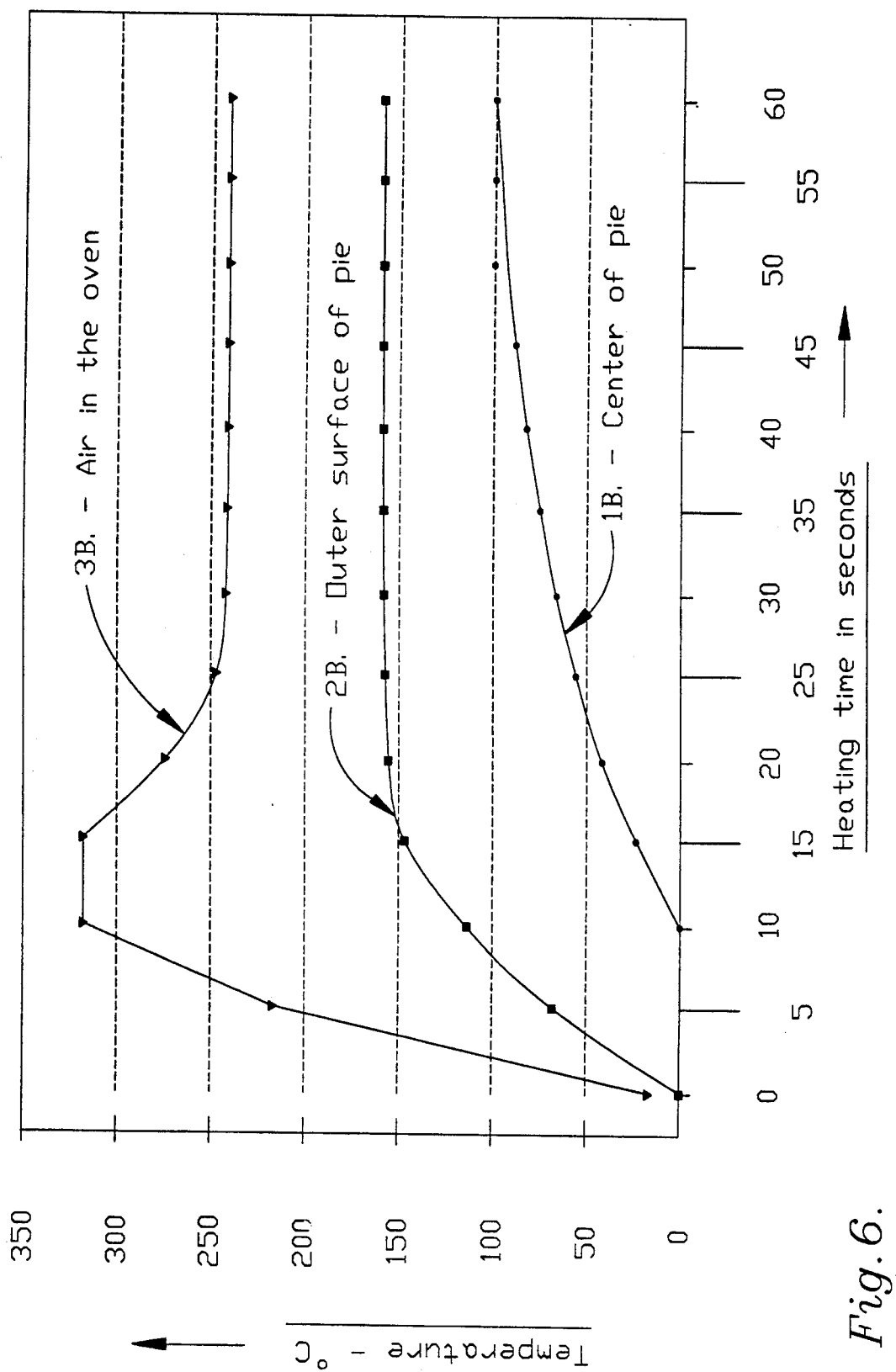
FIG. 6 is a heating curve graph for a steak and kidney pie cooked in accordance with another aspect of the present invention.

FIG. 2 relates to the initial burst of conventional heat and commencement of microwave heating in an oven as starting simultaneously. According to another aspect of this invention, the initial burst of conventional heat will be completed before commencement of microwave heating. Microwave heating commences only after completion of the initial burst of intense heat. FIG. 6 exemplifies the resultant heating curves.

An advantage of this is that no perforated screen is required to guard any gas burners present from microwave radiation. This facilitates more direct, complete and rapid transfer of heat from the burners into the cooking chamber. This is one of several reasons why the initial heat burst is described in FIG. 6 as being faster than that described in FIG. 2. Additionally, infrared radiated heat from the hot burners, the plasma of the flame and the hot combustion gases at their hottest stage radiate directly into the cooking chamber. This would be considerably less so if there was a perforated shield between the burners and the cooling chamber, as in existing combination ovens using gas combustion.

Another advantage of this aspect of the invention is for food items much smaller than the 200 gr. steak and kidney pie discussed. A 50 gram croissant, for instance, would be internally heated by microwaves approximately 4 times as fast as a 200 gram food item. This internal heating could be so rapid as to be even faster than conventional heating of the outer surface, despite the initial burst of conventional heat in the oven. Hot water vapor from the center of the croissant might, therefore, condense on a relatively cooler outer crust, making it wet and soggy. A major aim of the present invention is, as stated, to prevent such an occurrence. This is, however, better prevented if the initial heat burst is completed before the commencement of microwave heating. This desirably increases the dynamic temperature gradient between the food item's center and its surface, as exemplified in FIG. 6, relative to that described in FIG. 2. That is to say, the relative distance between Curves 2B and 1B in FIG. 6 is greater than that between Curves 2A and 1A in FIG. 2, particularly during the critical early stages of heating. The center of most heated food products is moist and therefore does not usually heat above 100° C., the boiling point of water at atmospheric pressure. As exemplified by Curve 1B in FIG. 6, the food surface can be hotter than 100° C. before commencement of microwave heating. In such an instance it is impossible for hot water vapor from the center of the food to condense on its outer surface.

The combination oven according to this invention possesses all the modes of the known combination ovens. It can be used with microwaves only or as a conventional convection oven only or in the combined mode. Furthermore, the oven may be operated with a slower come-up time for conventional oven heating, should this be desired.

The combination oven in accordance with this invention may primarily be used for the reheating of three basic food groups:

A. Ready-made frozen foods stored at about −18° C. In this case the hot air would reach about 400° C. for about 3 seconds.

B. Ready-made chilled food stored at about +4° C. In this case the hot air would reach about 320° C. for about 3 seconds.

C. Ready-made, sterilized foods stored at room temperature (usually about +20° C.). In this case the temperature would rise to about 260° C. for about 3 seconds.

In all modes the duration of the heating is fixed independently, according to the operator's desire. For all functions involving the convection oven component of the present combination oven the temperature is also determined by the operator, albeit aided by advisory operating instructions supplied with the oven. In the case of the three aforesaid modes A, B and C this temperature would be the stable temperature attained at the end of the initial heating cycle. In the instances described in FIG. 2 and FIG. 6, this stable temperature determined by the operator would be 260° C. achieved at the end of the 40 and 30 second rapid, high temperature cycles respectively.

The three aforesaid modes of operation are aimed primarily at reheating ready-made foods. Nevertheless they could also be used for a number of other rapid-cooking applications, which would benefit from the rapid come-up time to the desired oven air's temperature. After completion of the rapid, high temperature cycle, the food would continue to cook at the lower, steady oven temperature. Examples would be microwave combined with conventional convection heat cooking for:

A. Finish-baking of frozen, half-baked bread, buns, etc.

B. The baking of biscuits (known as "cookies" in the United States).

C. The baking of bread from freshly made dough.

D. The baking of farinaceous products that have been prepared and frozen immediately before the baking stage.

E. The roasting of meat, particularly small cuts, where the rapid cooking of the interior would have to be matched by rapid browning of the exterior.

F. The roasting of green coffee beans.

G. The cooking or popping of popcorn. With the combined mode of microwaves and conventional heat it is estimated that the percentage of problematic corns that will not pop, the "non-poppers" will be markedly reduced.

As aforesaid the combination oven can use, as conventional heat, gas only, electrical resistance elements only or a combination of the two. There now follows a description of the method of incorporation each option into the present invention.

As regards conventional heat supplied by gas, by the method outlined in FIG. 6 and described above, the initial high oven temperature is achieved by exposing the cooking chamber to gas burner or burners for about 10 seconds. Once the required temperature is attained flames from the burners are extinguished or shielded from the microwaves which then switch on automatically.

One embodiment using the above principle has auxiliary gas burners positioned in the cooking chamber which supply an initial burst of conventional heat. After the initial burst the burners extinguish and microwave heating commences. After this the burners can operate behind a microwave shield in conjunction with an air circulating fan to circulate the hot air into the cooling chamber.

Alternatively the oven is separated into the cooking chamber and a chamber in which those burners reside, by an openable partition. In addition the burner can be moveable into the cooking chamber by a pivot and/or a sliding device. To effect the initial heating the partition opens, the burners advance into the cooling chamber and ignite providing the initial conventional heating burst. After this initial burst the burners retreat from the cooking chamber and the partition closes. The microwave heating then commences.

Using gas burners for a rapid initial burst of heat only would have the advantage of obviating the requirement for a ventilation system in the kitchen as the exhaust gases are limited.

In a second embodiment of the heating method outlined in FIG. 6, the initial burst of conventional heat is provided by electrical resistance elements. As in conventional combination ovens heating is provided by microwaves, hot air convection and/or a grill attached to the ceiling of the oven chamber. In addition there is provided an auxiliary electrical heating element, supplementing the grill if present, that utilizes the maximum electric current available to the oven. An air circulating fan is directed such that it passes air rapidly over the auxiliary heating element, removing heat from it to the surrounding air. For 10-20 seconds the maximum amount of electrical current available to the oven is supplied to the auxiliary and other conventional heating elements. This includes the current otherwise required for microwave generation. No microwaves are generated in this period. This heat is passed to the food by direct infra-red radiation and by hot air blown by the fan. After the initial 10-20 seconds the electric current supplied to the auxiliary heating element is switched to supply the microwave generator. Conventional heat from the grill and/or other elements is maintained together with the microwave heating. The auxiliary heating element provides for rapid initial heating and when applied for such a short period the strong infra-red radiation does not burn the food for reasons aforesaid. Alternatively a larger auxiliary heating element could be positioned away from the grill in a rear chamber of the oven. In being so positioned it would supply much less direct infra-red radiation to the food, so preventing excessive browning or burning, should this prove to be a problem.

In a third embodiment of the method exemplified in FIG. 6, the conventional heat is supplied by electrical resistance elements and gas burners. The gas is used as aforementioned to provide an initial rapid burst of heat. After the initial burst the oven is then operated by electricity only to provide microwave and conventional electrical resistance heating. With electrical heating elements provided in the oven, internal gases therein from the gas burners are recirculated past the heating elements. This reduces the hot exhaust gases released from the oven to the surroundings and further reduces the requirement for a ventilation system. An auxiliary electrical resistance element could be used as aforementioned in combination with the gas to assist in creating the initial burst of heat.

Figure 3:
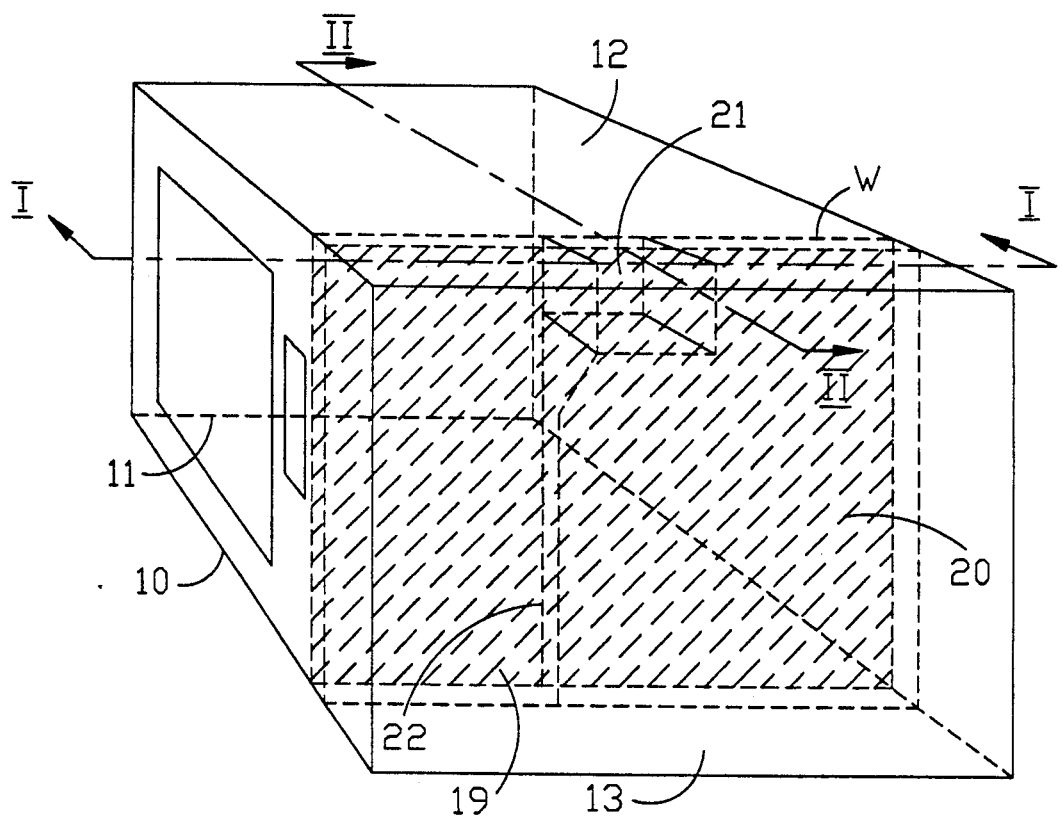
FIG. 3 is a perspective view of a combination oven constructed in accordance with the present invention.
Figure 4:
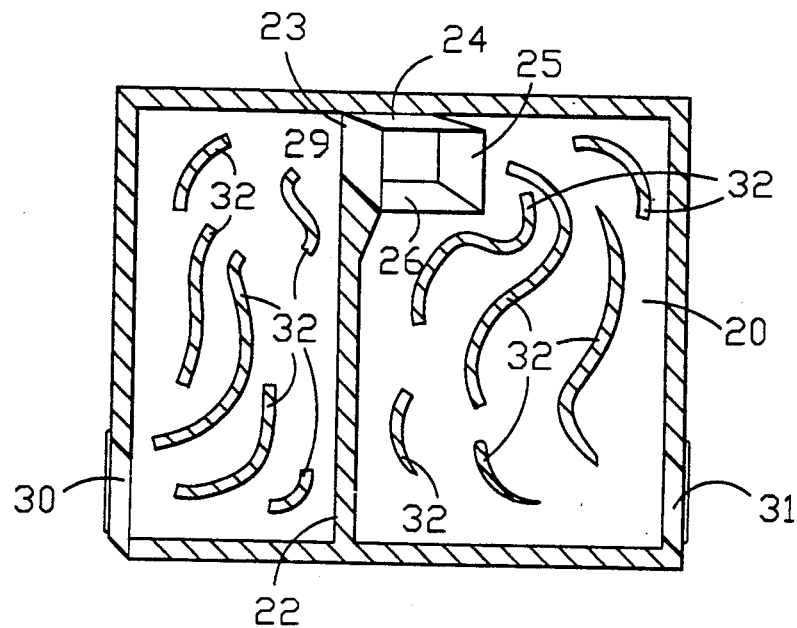
FIG. 4 is a sectional view along line I—I of FIG. 3.
Figure 5:
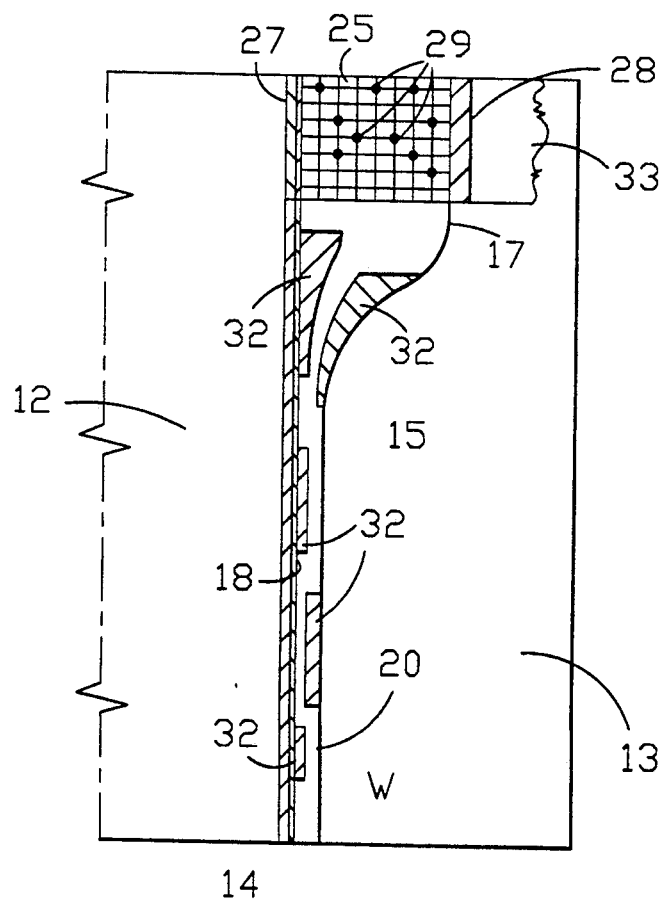
FIG. 5 is a sectional view along line II—II of FIG. 3.

Referring to FIGS. 3-5 there is shown the combination oven having a door with a window therein. The oven is divided into two chambers: a cooking chamber and a heat-protected chamber containing heat-sensitive electronic components (not shown). The chambers are separated by a double wall partition generally indicated by arrow W. The double wall partition W comprises a first substantially flat metal panel extending across the full height and depth of the oven and a second metal panel spaced apart therefrom to form a cavity. The second metal panel is parallel to the first panel but has a central stepped portion at one end approximately three quarters height to provide an increased depth in the cavity at that point. This is seen clearly from FIG. 5. At the top of an in the center of each of these metal panels is a rectangular gap the size of non-metallic, infra-red absorbing panels into which the panels fit (See FIG. 3 and FIG. 5), that, being of an appropriate non-metallic material, permit the free passage of microwaves. With the exception of the aforementioned gap, the first metal panel is lined with an insulating panel on its cavity facing side. The insulating panel is made from a thermally insulating material with a thermal capacitance, for example a ceramic.

The cavity is divided into three chambers 19, 20, 21 by partition panels 22, 23, 24, 25, 26. A first chamber is approximately one third the volume of the cavity, the second chamber occupies the rest of the volume except for a relatively small third chamber approximately cubic in dimension occupying part of the widened portion of the cavity. Partition panel 22 separates the first chamber 19 from the second chamber 20 and partitions 23, 24, 25, 26 define four walls of the third chamber 21 within the second chamber 20. The metal panels 14, 15 have infra-red absorbing microwave transparent panels 27, 28 fitted precisely into exactly sized gaps in metal panels 14, 15 and fitted into the appropriate sides of the third chamber. Panels 23, 25 have holes 29 therethrough to allow communication with, i.e. the passage of cooling air through to the first and second chambers 19, 20.

The first chamber 19 has an inlet 30 communicating with the surroundings, the second chamber has a similar outlet 31.

The first and second chambers 19, 20 have curved fins 32 disposed therein, arranged in a predetermined manner as shown in FIG. 4. The fins 32 are attached to walls 14, 15 and extend approximately across half the width of the cavity 16 (see FIG. 5).

Cooling air is drawn through the double wall cavity 16 to remove heat which would otherwise pass from the cooling chamber 12 to the heat protected chamber 13. The cooling air enters into the first chamber 19 through inlet 30 passes through, respectively, the first 19, third 21 and second 20 chambers via the holes 29 in the panels 23, 25 and leaves through the outlet 31 in the second chamber 20.

The cooling air flows evenly through the three chambers 19, 20, 21 guided by the aerodynamically designed fins 32. Where gas burners are employed as the sole source of conventional heat, the cooling air from outlet 31 is used to supply the burners. In such an instance, heat produced by gas combustion in the oven is proportional to the amount of gas burnt and to the amount of air used to burn it, i.e. an increase in the heating rate effects an increase in the cooling air drawn through the double wall partition W and is passed to the burners. Thus, also, the air recycles heat removed from oven cavity 12 via panels 14, 18 and 27 back into the oven 12. Strong convection currents of the burners' hot combustion gases serve, also, to draw air through wall partition W, without necessarily needing a fan to do so.

The third chamber 21, is positioned adjacent to a microwave waveguide 33, forming a continuation and the end section of it. This allows the free passage of microwaves from the magnetron to the cooking chamber 12 via the waveguide and non-metallic, microwave-transparent plates 27, 18. Harm to the magnetron by infra red rays, emanating from the hot walls and gases in oven chamber 12 and traveling back through the waveguide 21 and 33 to the magnetron, is additionally prevented. This is because panels 27, 28 also absorb infrared rays and turn them into heat. Once formed, this heat is thereafter removed by the flow of cooling air entering said chamber 21 via perforations 29 in panel 23 and exiting via similar performations in panel 25 (See FIG. 4).

The holes 29 in panels 23, 25 allow the free and effective passage of the cooling air from chamber 19 through to chamber 20 via chamber 21 (see FIG. 3 and FIG. 4) but are too small to allow leakage of microwave radiation out of the waveguide 33 and 21 via panels 23, 25 and into chambers 19. 20. The holes 29 are dimensioned to have a diameter about one tenth of the microwave wavelength or less.

The infra-red absorbing panels 27, 28 are sufficiently insulating to provide for temperature drops across their thickness. Further cooling is effected by the passage of cooling air as described. This reduction in temperature of panel 27 prevents some infra-red radiation from being generated by it as such radiation is proportional to temperature. Any such infra-red radiation emitted by panel 27 not absorbed as heat and dissipated as such by the cooling air is absorbed by panel 28 and turned into sensible heat. The side of panel 28 facing panel 27, if hot, will also be cooled by the flow of cooling air. Hence the side of panel 28 facing the waveguide 33 should be sufficiently cool not to emit infra-red radiation. Obviously, further panels could be introduced to improve the absorption and dissipation of infrared radiation turned into sensible heat.

The thermally insulating panel 18 is designed to absorb sudden temperature rises and to decelerated the heat transfer from the cooling chambers 12 to the heat protected chamber 13.

The embodiments of the present invention may include a fan placed in front of panel 23 or behind panel 25 of the third chamber 21. When the heating rate is increased and the air flow becomes subject to viscous drag the fan can be used to accelerate the air flow or vice versa. If gas burners are supplied by the outlet of cooling air from outlet 31, this would facilitate the burning of more or less gas as appropriate. This fan could be adapted from the fan used to circulate the hot combustion gases evenly throughout the cooling chamber 12 as is common to such ovens. Alternatively the fan used to cool the microwave magnetron could so be adapted.

What is claimed is:

1. A combination microwave and convection oven for the heating of food, said oven comprising:
    walls defining a first heating chamber for receiving food to be heated, and an adjacent second chamber separate from said first chamber,
    said first chamber including an access door for selective placement into, and removal from, of food to be heated,
    said walls comprising a partition between and separating said first and second chambers for preventing passage of air between said first and second chambers, the partition including first and second, spaced apart wall members cooperatively presenting a cavity therebetween;
    convection heating means operatively coupled with said first chamber for raising the air temperature therein in order to heat food received in the first chamber;
    microwave radiation generating means located within said second chamber;
    means operatively coupled with said generating means for conveying microwave radiation through said partition and into said first chamber in order to heat said food therein, and for substantially preventing passage of infrared radiation from the first chamber to said microwave radiation generating means,
    said microwave radiation-conveying and infrared radiation passage-preventing means including a pair of spaced apart panels respectively located on opposite sides of said cavity and adjacent one of said first and second wall members, said panels being substantially transparent to the passage of microwave radiation therethrough, and substantially absorptive of infrared radiation; and
    means for circulating cooling air through said cavity and between said spaced apart panels.

2. The combination microwave and convection oven of claim 1, including a plurality of fins disposed within said cavity for directing the passage of circulating cooling air through the cavity.

3. The combination microwave and convection oven of claim 2, said convection heating means comprising an electrical resistance heating element.

4. The combination microwave and convection oven of claim 1, said convection heating means comprising a gas burner.

5. The combination microwave and convection oven of claim 4, including means for conveying air from said cavity to said gas burner.

6. The combination microwave and convection oven of claim 1, said microwave radiation generating means comprising a magnetron.

7. The combination microwave and convection oven of claim 1, said microwave radiation-conveying means including a waveguide operatively coupled between said generating means and the panel remote from said first heating chamber.

8. The combination microwave and convection oven of claim 1, including a perforate wall extending between said panels for directing circulating cooling air between the panels.

9. The combination microwave and convection oven of claim 8, the perforations of said wall being sufficiently small to substantially prevent leakage of microwave radiation therethrough.

10. A method of heating a product, the method comprising the steps of:
  placing the product into a first chamber of an oven
  raising the temperature of the air in said first chamber by convection heating in the oven to 260° to 400° C. within a period of up to about 25 seconds;
  maintaining the temperature of the air in said first chamber of the oven at 260° to 400° C. for a period of time less than about 3 seconds;
  reducing the temperature of the air in said first chamber of the oven by means of a convection fan to a desired constant cooking temperature of between 160° to 250° C.;
  maintaining the desired cooking temperature of the air in said first chamber of the oven; and
  microwave heating the product in said first chamber while maintaining the temperature of the air in said first chamber of the oven,
  said microwave heating comprising the steps of generating microwave radiation in a second chamber separate from said first chamber, directing said microwave radiation into the first chamber, and substantially preventing passage of infrared radiation from said first chamber to said second chamber.

11. The method as recited in claim 10, wherein the step of reducing the temperature of the air in the oven to a desired constant cooking temperature occurs in less than about 10 seconds.

* * * * *